March 22, 1960     I. D. McEACHERN     2,929,185
GATHERING ATTACHMENTS FOR COMBINES
Filed June 4, 1957     2 Sheets-Sheet 1

INVENTOR
IRVIN D. McEACHERN,
BY
ATTORNEYS

March 22, 1960 — I. D. McEACHERN — 2,929,185
GATHERING ATTACHMENTS FOR COMBINES
Filed June 4, 1957 — 2 Sheets-Sheet 2
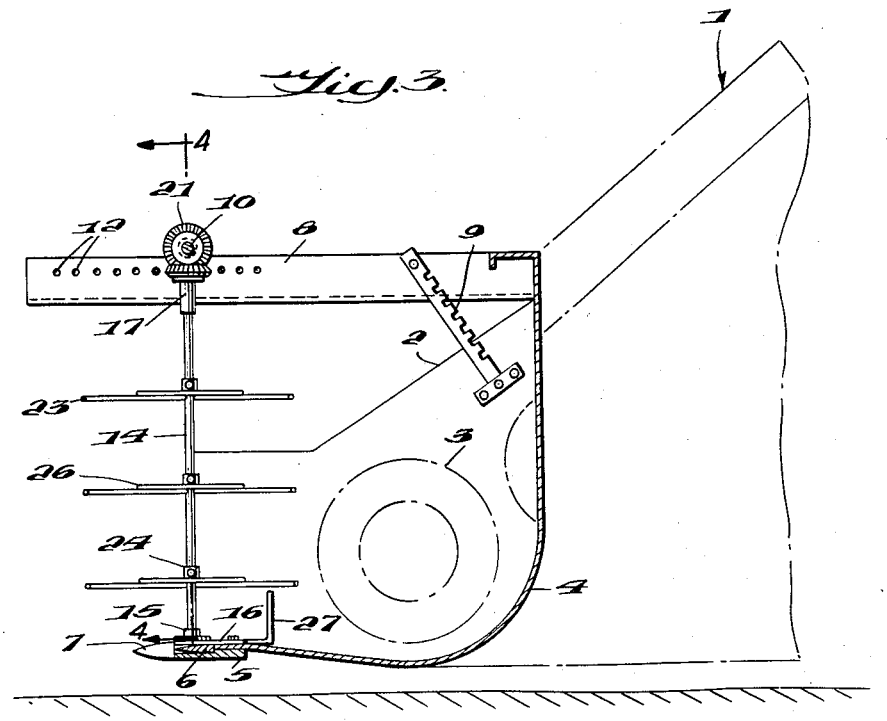
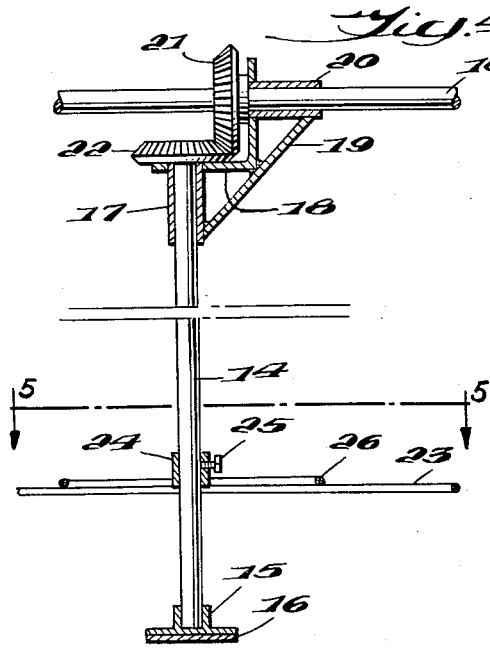
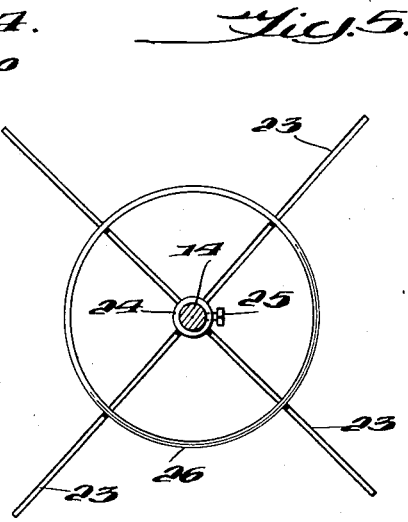
INVENTOR
IRVIN D. McEACHERN,
BY
ATTORNEYS

# United States Patent Office 2,929,185
Patented Mar. 22, 1960

2,929,185

GATHERING ATTACHMENTS FOR COMBINES

Irvin D. McEachern, Hale Center, Tex.

Application June 4, 1957, Serial No. 663,425

4 Claims. (Cl. 56—20)

This invention relates to improvements in gathering attachments for combines, and more particularly to combines that are used for the harvesting of row crops, such as grain sorghums.

Most combines that have been used heretofore for the harvesting of small grains have used a reel extending transversely of the header and rotating on a horizontal axis during the operation of the combine for forcing the upstanding grain in to the cutter bar and directing the cut grain into the header. Where such combines are used with row crops of the character of grain sorghums, it has been found that these have not been entirely satisfactory.

Grain sorghums, and other like types of grain usually planted in rows, very often fail to head out at uniform height. If the heads are of uneven height, the conventional reel will not function satisfactorily, but will cause a considerable waste by throwing the tall stalks over or deflecting them away from the combine, and it will not reach the short ones. This will result in a failure to obtain efficiency in an effective and complete harvesting of substantially all of the heads of grain.

It has also been the practice to use the combine for harvesting many different types of crops, both small grains such as wheat, oats and the like, and row crops such as grain sorghums, maize, etc. The small grains referred to usually are grown at uniform heights and it is desirable to use the reel on the combine for the harvesting of those grains, although other provisions for gathering the row crop grains are desirable. The reel and row crop gathering means should be interchangeable, so as to be replaced one with the other, according to the type of grain to be havested.

One object of this invention is to overcome the objections to the use of the conventional reel as a gathering device for row crops to be harvested with a combine, some of which objections have been noted above.

Another object of the invention is to improve the construction of the gathering device on a combine to provide for the efficient harvesting of grains having heads grown at different heights, such as grain sorghums, maize and the like.

Still another object of the invention is to provide for the gathering of grains upstanding in rows by rotary devices that operate on upright axes in pairs, so as to feed the grain in to the cutter bar without danger of loss of the heads.

These objects may be accomplished, according to one embodiment of the invention, by providing an attachment for the header of a combine constructed for gathering one or more rows of grain and feeding the same to the cutter bar and header. The attachment preferably is adapted for replacement of the conventional reel, so that if use of the combine be desirable for cutting small grain, the conventional reel may be used, but where row crops are involved, especially those in which the heads are not uniform, the reel can be taken off and replaced with this attachment.

The attachment comprises upright shafts arranged in one or more pairs, according to the number of rows to be harvested with the combine at one time, and mounted on the header, preferably in proximity to the cutter bar. A drive shaft is operatively connected with the upright shafts and may be driven by power from the reel driving mechanism of the combine. Each upright shaft carries a plurality of radiating arms or fingers, so arranged as to overlap the fingers of an adjacent shaft when these are used in a pair, to move the grain in to the cutter. Spider rings surround each shaft, of sufficient size to be disposed intermediate the length of the fingers, and are secured to the latter not only to brace the fingers, but also to prevent the entangling of the stalks with the upright shafts, thereby facilitating the movement of the grain in to the cutter bar. The fingers and spider rings can be adjusted relative to the shafts, if desired, to accommodate grains of different heights.

This embodiment of the invention is illustrated in the accompanying drawings, in which:

Fig. 3 is a cross section taken on the line 3—3 of Fig. 1, looking in the direction indicated by the arrows;

Fig. 4 is an enlarged vertical section through the gatherer attachment, taken on the line 4—4 of Fig. 3, looking in the direction indicated by the arrows with parts in elevation; and Fig. 5 is an enlarged horizontal section taken on the line 5—5 of Fig. 4, looking in the direction indicated by the arrows.

Figure 1:
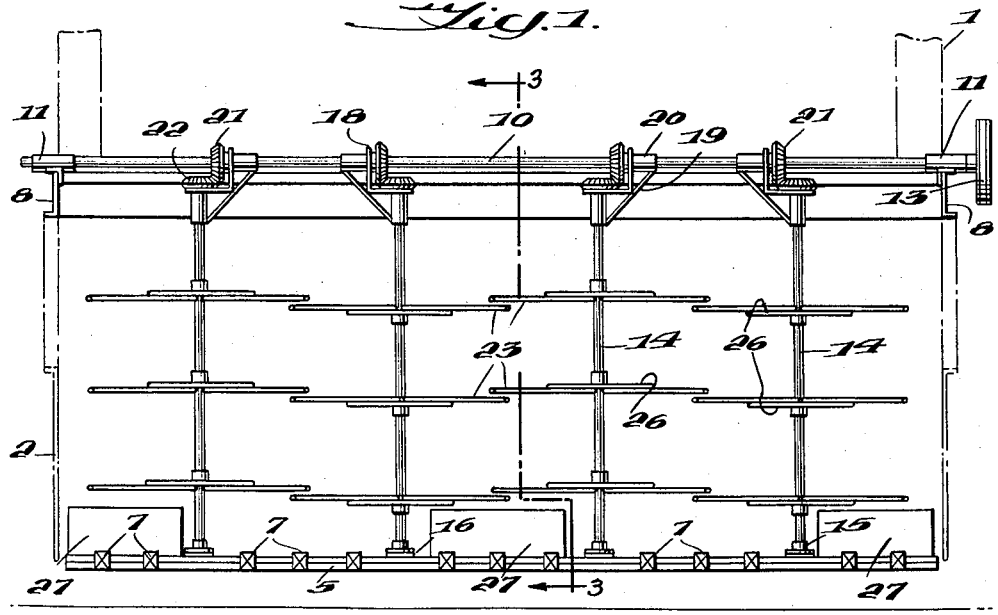
Fig. 1 is a front elevation of the header portion of a combine, shown in dotted lines, with the gatherer attachment applied thereto and shown in full lines.

The invention is shown as applied to a power combine, such as an all crop combine, adapted for the harvesting of different types of grains, both small grains and row crops. This combine 1 has a header at the front thereof for receiving the grain, within which the usual auger 3 is mounted for directing the grain laterally onto the apron or elevator of the combine. The auger trough is shown at 4 and extends under the auger 3 from the cutter bar, generally indicated at 5. The cutter bar includes the usual receiprocating sickle bar 6 and guards 7.

The header of a conventional combine normally has a reel extending transversely thereof over the cutter bar 5 for feeding the grain in to the cutter bar. This reel is not shown because it is replaced by this attachment. The shaft of the reel is usually supported on a pair of arms, indicated at 8, at opposite ends of the header 2, which arms are adjustable vertically for raising and lowering the reel, being pivoted at their inner ends to the frame of the combine and capable of raising and lowering movements by notched segments, indicated at 9. The arms 8 are used for supporting the drive shaft of this attachment after removal of the conventional reel shaft therefrom.

This drive shaft is indicated at 10 and is mounted in bearings 11 supported upon the arms 8 at opposite ends of the header 2. The bearings 11 are capable of adjustment lengthwise of the arms 8, being secured, in the illustrated embodiment, by bolting through selected holes 12 provided in the respective arms, as shown in Fig. 3. The drive shaft 10 is operated from the conventional reel driving mechanism 13 of the combine, such as by belts and pulleys, or in any other suitable manner.

Figure 2:
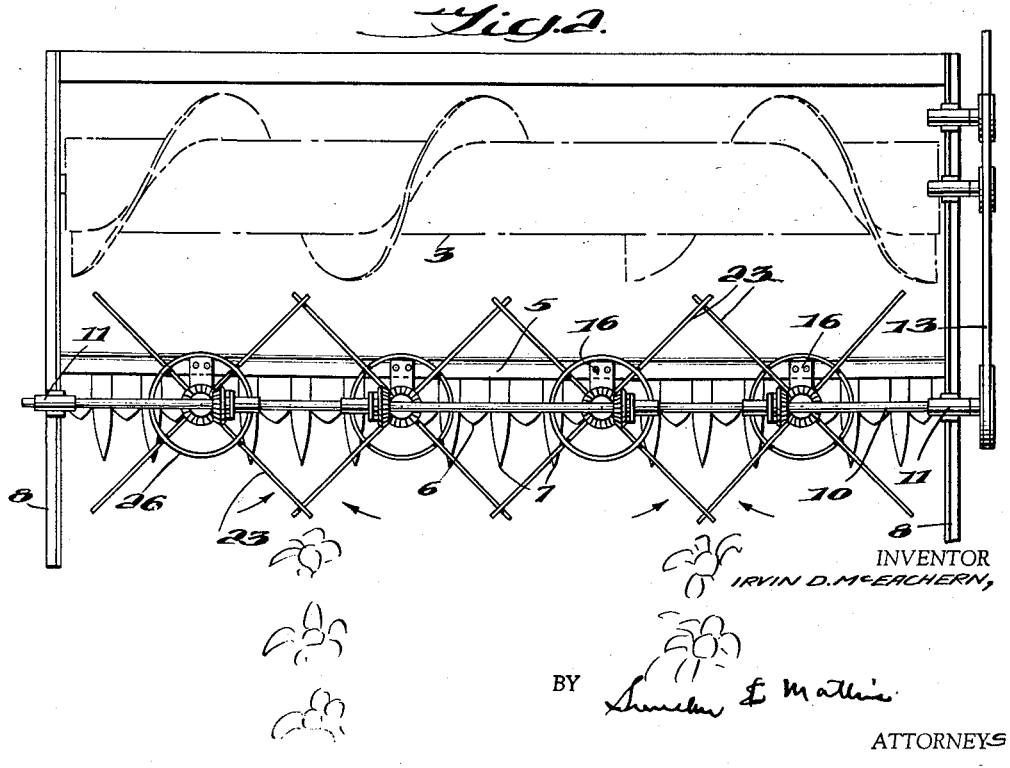
Fig. 2 is a top plain view thereof.

Spaced along the length of the drive shaft 10 and along the length of the header 2 are upright shafts 14 arranged in one or more pairs, according to the number of rows to be harvested at one time. Two pairs of shafts are shown in the drawings for illustration, being adapted for the harvesting of two rows of grain, as indicated in Fig. 2.

Each of the shafts 14 is mounted in a suitable bearing 15 at its lower end, such as a step bearing, which is shown in this embodiment as supported on a plate 16 secured upon the cutter bar 5. One of the guards 7 is removed and the supporting plate 16 can be secured on the cutter bar in place of the guard, to occupy the same position and in like manner, as a simple and convenient way of mounting the upright shaft 14 on the cutter bar.

Each shaft, at its upper end, is journaled in a bearing 17, shown more in detail in Fig. 4. The bearing 17 is held in place by an angle bar 18 and a brace plate 19 welded or otherwise secured thereto and to a bearing 20 in which the drive shaft 10 is journaled. Bevel gears 21 and 22 are fixed on the shafts 10 and 14, respectively, and are in mesh with each other to transmit rotation from the drive shaft 10 to the upright shaft 14. These gears 21 and 22 are held in positions relative to each other and in driving relation by the bearings 17 and 20 and the brace plates 18 and 19 which join the bearings securely together.

Each of the shafts 14 carries a plurality of radiating fingers 23, preferably extending in longitudinal alignment with the axis of the shaft. These fingers 23 are welded or otherwise secured to a mounting collar 24 sleeved over the shaft 14 with suitable means for anchoring the collar 24 to the shaft, such as a screw, pin or the like, generally indicated at 25 in Fig. 4. Thus, the radiating fingers can be adjusted vertically along the length of the upright shaft 14 to accommodate the heads of grain which may be at different heights, and to insure of the uniform and proper feeding of the stalks of grain in to the cutter bar. Any suitable number of sets of fingers may be used as desired, usually from two to four sets on each shaft, so as to catch both short and tall grain, and that of intermediate height. A spider ring 26 surrounds the shaft 14 and is of sufficient diameter so as to be disposed intermediate the length of the respective fingers 23, being welded or otherwise rigidly fixed thereto. The spider ring 26 serves not only to brace the fingers and assure rigidity thereof, but also wards off the grain to keep it from wrapping around the shaft 14 and to direct the upstanding stalks in to the cutter bar as the fingers 23 turn.

The operation of this attachment will be apparent from the foregoing description and from the illustration in the drawings. It is adapted for the harvesting of grain sorghums, maize and other row crops, as indicated particularly in Fig. 2. A pair of upstanding shafts 14, with their gathering fingers, are disposed to be operated on opposite sides of each row of grain. The driving of the shaft 10 through the usual reel driving mechanism 13, such as a belt and pulleys, as illustrated, causes rotation of the upright shafts 14, which are geared to the drive shaft 10, as shown in Figs. 3 and 4. The fingers 23 on the pair of shafts 14 should be mounted on the respective shafts, so as to be in close proximity to each other, but to clear one another as these shafts are rotated, as will be apparent from Fig. 1. Furthermore, the shafts of each pair are spaced apart not only to receive the row of stalks therebetween, but sufficiently close that the fingers 23 will overlap each other during rotation of the shafts, as indicated in Fig. 2. It is obvious that the shafts of each pair are rotated in opposite directions, which is accomplished by reversing the positions of the gears 21 relative to the gears 22.

The form of attachment illustrated as one embodiment of the invention is adapted for harvesting two rows of grain, as shown in Fig. 2. As the combine is moved along the rows with the fingers 23 moving in overlapping relation in pairs, in the direction shown by the arrows in Fig. 2, it will be apparent that the respective stalks will enter between a pair of fingers 23 on the adjacent shafts and will be drawn in upstanding positions in to the cutter bar 5 for severing by the sickle bar 6. The fingers will continue to move inward in a direction to lay the severed stalks of grain over in the header 2, where they will be picked up by the auger 3 and moved into position for travel through the combine in the usual manner. The vertical disposition of the several sets of fingers 23 will insure that stalks of all heights will be gathered thereby, uniformly and without substantial waste of grain, and none of these will be pushed over, either to miss the cutter bar or to pass under the combine without being cut. On the contrary, the grain will be drawn in to the cutter bar in upstanding relation to insure of proper severance and saving of substantially all of the heads of grain.

It is possible to adjust the gathering device not only to accommodate grains of different heights and a variation of heights within a single crop, but also to adjust the spacing of the rows by varying the spacing between the shafts 14 of each pair, which is accomplished by moving the bearings 20 lengthwise of the shaft 10 and varying the mounting of the bearings 15 on the cutter bar or other suitable portion of the header. Each unit of the gathering device is complete in itself, not only for the adjustment mentioned, but also for replacement thereof when desired, permitting its removal from the combine for use of the conventional reel when cutting small grains that are sown uniformly and not in rows.

The overlapping relation of the fingers 23, as illustrated in Fig. 2, and the vertical disposition of the fingers in close proximity to each other, assures that the fingers on one shaft of the pair will have substantial wiping relation with the fingers of the other shaft of the same pair, so as to rake or pull the heads of grain off each other, propelling the heads back into the auger trough with substantially no danger of shattering of the grain, which would cause loss thereof or of throwing the heads to the ground.

Each set of fingers 23 is of such length that the fingers on one shaft would overlap the fingers of the other cooperating shaft of the same pair, and thereby wipe the heads and stalks off the fingers as these fingers rotate in the directions indicated by the arrows in Fig. 2. They make it possible for the fingers to insure of raking the heads off of the relatively rotating fingers and directing the same into the auger trough.

It will be apparent from the description and illustration of the fingers 23, as shown in Fig. 2, that the fingers 23 can overlap to a greater extent than the outer circumference of the spider rings 26. With the fingers 23 extending just beyond the spider rings, the construction assures that these fingers will rake or wipe the heads of grain from the overlapping or underlapping fingers of the other companion shaft of the pair. Therefore, there will be no serious danger of loss of grain, but instead there will be an effective removal thereof and direction of the grain into the auger trough.

Sometimes the rotation of the auger 3 will cause heads of grain to be hurled back toward the cutter bar on the floor of the header 2. If the fingers 23 should be sufficiently close to the cutter bar, the rotation of the fingers might cause such heads of grain to be raked forward of the cutter bar and onto the ground, especially at the spaces other than those between the pairs of cooperating shafts. To avoid such possibility, a guard or baffle plate, indicated at 27, may be mounted in upstanding relation just behind the cutter bar 5, as indicated in Figs. 1 and 3, in each space where there may be a tendency for the heads to be thrown forward by the fingers off the header.

No shattering of the grain is possible with this attachment, but the grain is severed and fed into the combine uniformly, regardless of the height of the stalks and substantially without waste. Moreover, the attachment is capable of being applied to or removed from a combine for interchangement with a conventional reel when broadcast grain is to be harvested.

The construction is simple and inexpensive to build, and yet very effective for the purpose described. It is sufficiently rigid and sturdy that it may be operated, handled and removed without danger of destruction and without needing substantial repairs. It is economical to construct and use and the parts are readily replaceable when needed. It can be used for one or multiple rows, as desired, and with many different types and sizes of combines.

While the invention has been illustrated and described in one embodiment, it is recognized that variations and changes may be made therein without departing from the invention as set forth in the claims.

I claim:

1. In a combine for harvesting grain including a cutter device and a header structure for receiving the severed grain, the combination therewith of a gathering mechanism comprising pairs of upright shafts spaced apart in front of the header structure, means mounting the pairs of upright shafts at the lower ends thereof on the cutter device, a transverse drive shaft mounted on the header structure, said transverse drive shaft having journal bearings thereon journaling the upper ends of the respective shafts, means forming a driving connection between said drive shaft and the upper end of said upright shafts, a plurality of radiating fingers spaced circumferentially around each upright shaft, and an annular means concentric with respect to the axis of each of said shafts, each of which annular means is rigidly secured to said fingers of said respective groups of fingers a spaced distance outward from the axis of each of said shafts for preventing grain stalks from winding around said shafts, said fingers extending outwardly from said respective annular members and being arranged in groups spaced lengthwise of said shafts for directing severed grain stalks into the header structure, the rotational axes of the respective groups of fingers on each shaft being common with the axis of the respective shafts.

2. In a combine for harvesting grain including a cutter device and a header structure for receiving the severed grain, the combination therewith of a gathering mechanism comprising pairs of upright shafts spaced apart in front of the header structure, means mounting the upright shafts at the lower ends thereof on the cutter device, a transverse drive shaft mounted on the header structure, said transverse shaft having journal bearings mounted thereon journaling the upper ends of the respective upright shafts, gear means forming a driving connection between the drive shaft and the upper ends of said upright shafts, a plurality of radiating fingers spaced circumferentially on each upright shaft and being arranged in groups spaced lengthwise thereof for directing the severed grain into the header structure, and at least one annular element mounted concentrically with respect to the axis of each of said upright shafts and being rigidly attached to at least one group of said radiating fingers spaced around the respective upright shafts and extending outwardly from the respective annular elements, with the rotational axes of the respective groups of fingers on each shaft being common with the axis of the respective shafts, said annular elements preventing the severed grain from winding around the shafts.

3. In a combine for harvesting grain including a cutter device and a header structure for receiving the severed grain, the combination therewith of a gathering mechanism comprising pairs of upright, spaced apart shafts mounted on said header structure on the front thereof, a conveyor structure mounted in the header structure for conveying the severed grain, a plurality of radiating fingers spaced around each upright shaft and being arranged in groups spaced lengthwise thereof for directing the severed grain into the conveyor structure, an annular means surrounding each upright shaft and spaced outwardly therefrom and being concentric with respect to the axis of said respective shafts, and rigidly secured to said fingers intermediate the length thereof, with the rotational axes of the respective groups of fingers on each shaft being common with the axis of the respective shafts, said annular means preventing the severed grain from winding around the respective shafts.

4. A gathering mechanism for a combine as defined in claim 3, wherein one of said annular means is secured to each group of fingers spaced lengthwise of the respective shafts.

References Cited in the file of this patent

UNITED STATES PATENTS

| | | |
|---|---|---|
| Re. 10,601 | Matthews | May 26, 1885 |
| 125,318 | McLeish | Apr. 2, 1872 |
| 388,684 | Hunt | Aug. 28, 1888 |
| 539,091 | Smith | May 14, 1895 |
| 1,806,928 | Bartels | May 26, 1931 |
| 2,836,026 | Gray et al. | May 27, 1958 |